United States Patent [19]

Rose

[11] Patent Number: 5,459,358

[45] Date of Patent: Oct. 17, 1995

[54] METHOD AND APPARATUS FOR RANDOMLY DELAYED ACTIVATION OF ELECTRICAL LOADS

[75] Inventor: William J. Rose, West Hartford, Conn.

[73] Assignee: Hubbell Incorporated, Orange, Conn.

[21] Appl. No.: 980,949

[22] Filed: Nov. 24, 1992

[51] Int. Cl.$^6$ ................................................ H01H 47/00
[52] U.S. Cl. ........................................ 307/139; 307/141.4
[58] Field of Search ................................... 307/112, 116, 307/125, 126, 130, 131, 139, 140, 141, 141.4; 361/42, 111

[56] References Cited

U.S. PATENT DOCUMENTS

| | | | |
|---|---|---|---|
| Re. 32,474 | 8/1987 | Reid | 307/141 |
| 4,053,790 | 10/1977 | Myers | 307/141.4 |
| 4,145,617 | 3/1979 | Lee et al. | 307/141 |
| 4,345,747 | 10/1982 | Borowski et al. | 307/140 |
| 4,733,100 | 3/1988 | Nusairat et al. | 307/141 |
| 4,870,526 | 9/1989 | Maruta et al. | 307/140 |
| 4,950,913 | 8/1990 | Kephart | 307/116 |

*Primary Examiner*—Jeffrey A. Gaffin
*Attorney, Agent, or Firm*—Jerry M. Presson; Joseph B. Lerch

[57] ABSTRACT

An automotive battery charger or other electrical device which draws substantial amounts of power is provided with a variable delay mechanism which prevents turn on of the device when power is applied. The duration of the delay is determined by a random or pseudorandom number generator, so that a plurality of different electrical devices will, in effect, be turned on at random times following application of power. The maximum turn on delay could be conveniently limited to a specific period of time, so that critical operating times of the device, such as the charging cycle of a battery charger, are not shortened excessively.

10 Claims, 4 Drawing Sheets

METHOD AND APPARATUS FOR RANDOMLY DELAYED ACTIVATION OF ELECTRICAL LOADS

FIELD OF THE INVENTION

The present invention relates generally to electrical power distribution and, more particularly, concerns a method and apparatus for staggering the application of electrical power to utilization devices so as to avoid power grid disruptions during peak utilization periods.

BACKGROUND OF THE INVENTION

Recent events and discoveries have resulted in a major increase in activity in the development of electrical cars. However, although significant advances have been made in the technology of electric motors and motor controls which make electrical cars feasible, electrical cars cannot become a reality until devices and methods are provided for charging the batteries of such vehicles safely at home, at work, and in shopping districts. Since the energy requirements for charging stations for electric cars are very high, on the order of 100 amperes or more per vehicle, it is likely that a disruption of the power grid could occur if thousands of battery chargers began charging automotive batteries at the same time. This could readily occur after a power failure if the chargers were allowed to begin charging immediately upon the restoration of power, or early in the morning when workers all arrive at work simultaneously and begin charging their vehicles. Electrical utilities are therefore insisting that automotive chargers have manual reset mechanisms or some sort of device for insuring that the charger does not come on immediately upon the application of power.

From the user's point of view, manual reset mechanisms are unacceptable. A momentary power outage occurring while an automobile owner is sleeping or absent, or otherwise unable to reset the charger, could result in the charger not being reset, and the user could be faced with dead batteries when he returns to his car. To address this problem, it has been suggested that the reset mechanism be provided with an alarm to alert the owner to reset the charger. However, an alarm would be useless when the owner is not available to hear it, and it would be particularly objectionable if it went off during the middle of the night.

It has also been suggested that preset or user-selectable delays be provided to keep chargers from turning on for a certain period of time (e.g. 5, 10 or 15 minutes). However, preset delays would still allow a considerable number of cars to turn out at the same time. Furthermore, if users were permitted to select the duration of the preset, they would, most likely, select the shortest delay to give them the longest possible charge period. Also, a shopper may often run many errands at different locations, with each of the errands taking relatively short periods of time. The accumulated drain on the batteries might be such that the car needs to be recharged during the day at one of these locations. In this situation, a delay of 15 or 20 minutes might render the charge cycle too short to significantly affect the charge on the batteries.

Broadly, it is an object of the present invention to provide a method and apparatus for restoring power to battery chargers and other high current electrical devices, which method and apparatus eliminate the danger of a disruption of the power grid and also avoid the above-mentioned shortcomings. It is specifically contemplated that power should be restored to different electrical devices at different times.

It is another object of the present invention to provide a method and apparatus for restoring power to electrical devices following a power outage which do not depend upon a person to reset the power.

It is another object of the present invention to provide a method and apparatus for restoring power to electrical devices following a power outage which do not have preset turn-on delays or turn-on delays selectable by a user.

It is also an object of the present invention to provide a method and apparatus for restoring power to electrical devices subsequent to a power outage, which are reliable and convenient in use, yet relatively inexpensive in utilization or construction.

In accordance with the present invention, an automotive battery charger or other electrical device which draws substantial amounts of power is provided with a variable delay mechanism which prevents turn on of the device when power is applied. The duration of the delay is determined by a random or pseudorandom number generator, so that a plurality of different electrical devices will, in effect, be turned on at random times following application of power. The maximum turn on delay could be conveniently limited to a specific period of time, so that critical operating times of the device, such as the charging cycle of a battery charger, are not shortened excessively.

BRIEF DESCRIPTION OF THE DRAWINGS

The foregoing brief description, as well as further objects, features, and advantages of the present invention will be understood more completely from the following detailed description of a presently preferred, but nonetheless illustrative, embodiment in accordance with the present invention, with reference being had by the accompanying drawings, in which.

DETAILED DESCRIPTION OF THE PREFERRED EMBODIMENT

Figure 1:
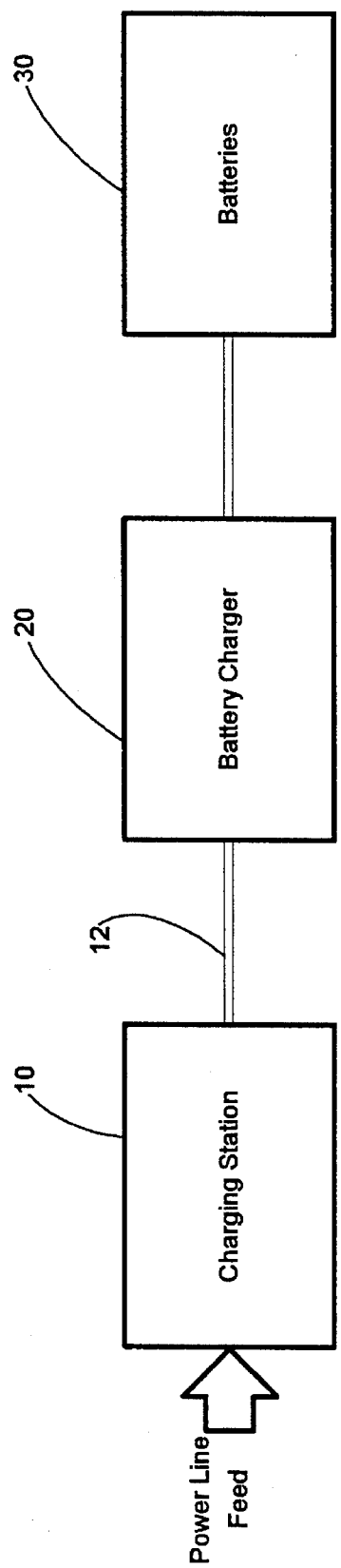
FIG. 1 is a schematic block diagram illustrating a battery charging system embodying the present invention.

FIG. 1 is a schematic block diagram illustrating how the present invention could be utilized in an automotive battery charging system. The system comprises a charging station, which receives electrical power from a power line feed, typically the electrical power supplied from a utility. Charging station 10 is designed for high capacity battery charging and is capable of supplying the required voltage and current to achieve efficient charging. The station also provides ground fault interruption circuitry and surge protection, and similar safety features. Charging station 10 is coupled to a battery charger 20 through a charging cable 12, which not only provides power from the charging station to the battery charger, but could also be used to provide electrical communication between them.

Battery charger 20 is a conventional battery charger. As is typical with these types of devices, it conditions the power supplied by the charging station so that it can be used by the automotive batteries 30, and it controls the charge rate and level of charge on those batteries. The battery charger charges the batteries through a conventional charging cable.

Figure 2:
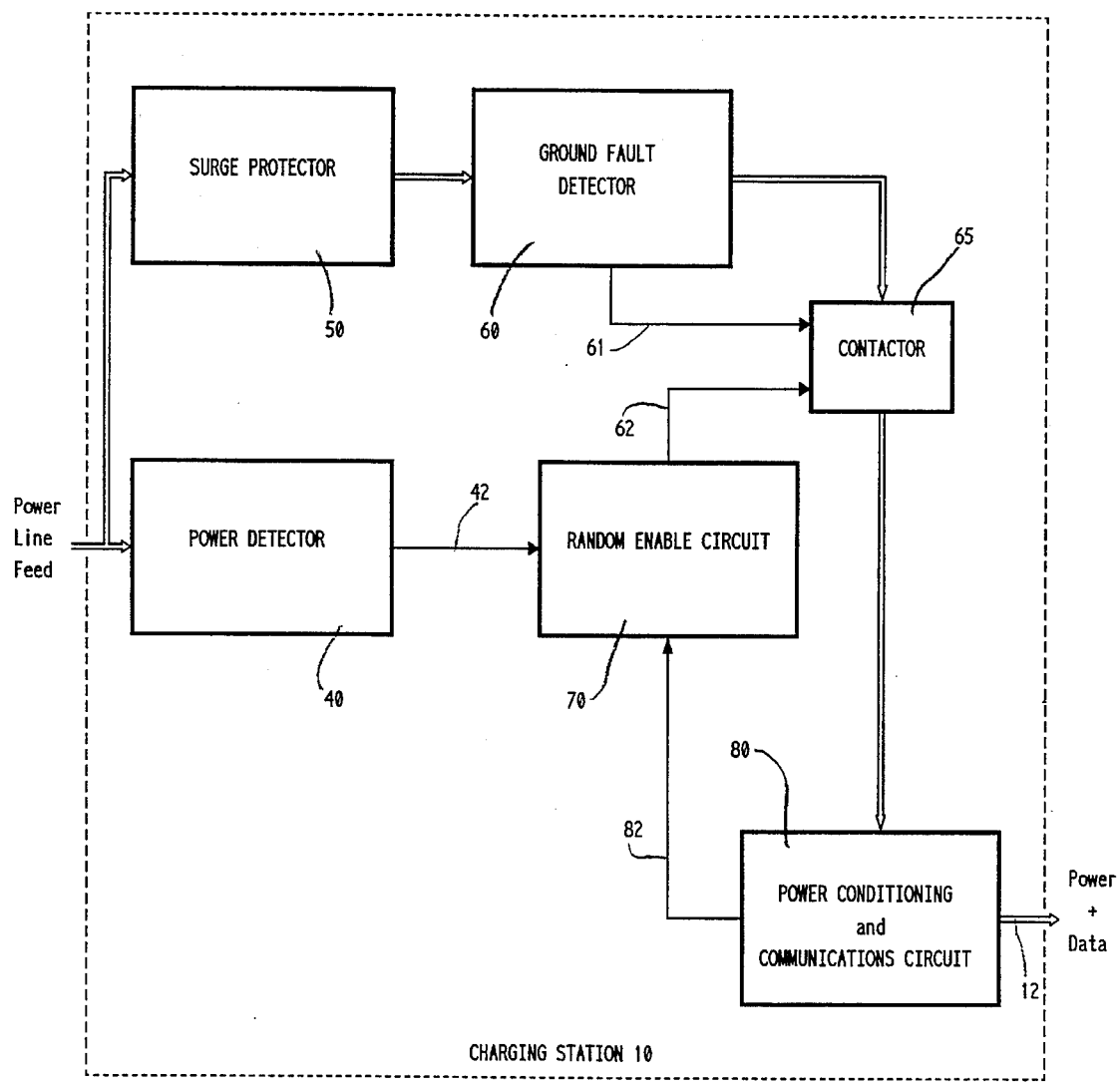
FIG. 2 is a schematic block diagram illustrating the structure of charging station 10 of FIG. 1.

FIG. 2 is a schematic block diagram representation of charging station 10 of FIG. 1. Electrical power from the power line feed is applied to a power detector 40 and a surge protector 50. These are conventional elements for a charging station. The power detector 40 senses the presence of power on the power line feed and provides an electrical signal indicative of the presence of power to a random enable circuit 70. As is conventional with devices of this type, surge protector 50 will simply pass the power applied to it, unless a power surge occurs, in which event, surge protector 50 would typically limit voltage or current flow.

From surge protector 50, power is applied through ground detector 60 to contactor 65. Contactor 65 is normally closed and will therefor pass any power applied to it. Detector 60 causes contactor 65 to open via control lead 61, interrupting the flow of power upon the occurrence of ground faults, short circuits and similar failure conditions. Contactor 65 is also controlled by random enable circuits 70 via lead 62, in a manner described below. In the absence of an interruption of power, contactor 65 will pass power to power conditioning and communication circuit 80. Circuit 80 may include such conventional elements as voltage and current regulators and noise and transient filters if they are not provided in the charging station. In addition, circuit 80 includes elements which provide for electrical communication between charging station 10 and battery charger 20. Such communication could provide information about the charging station to the battery charger and about the battery charger to the charging station. Accordingly, the output of circuit 80 (and charging station 10) includes both power and data.

Figure 3:
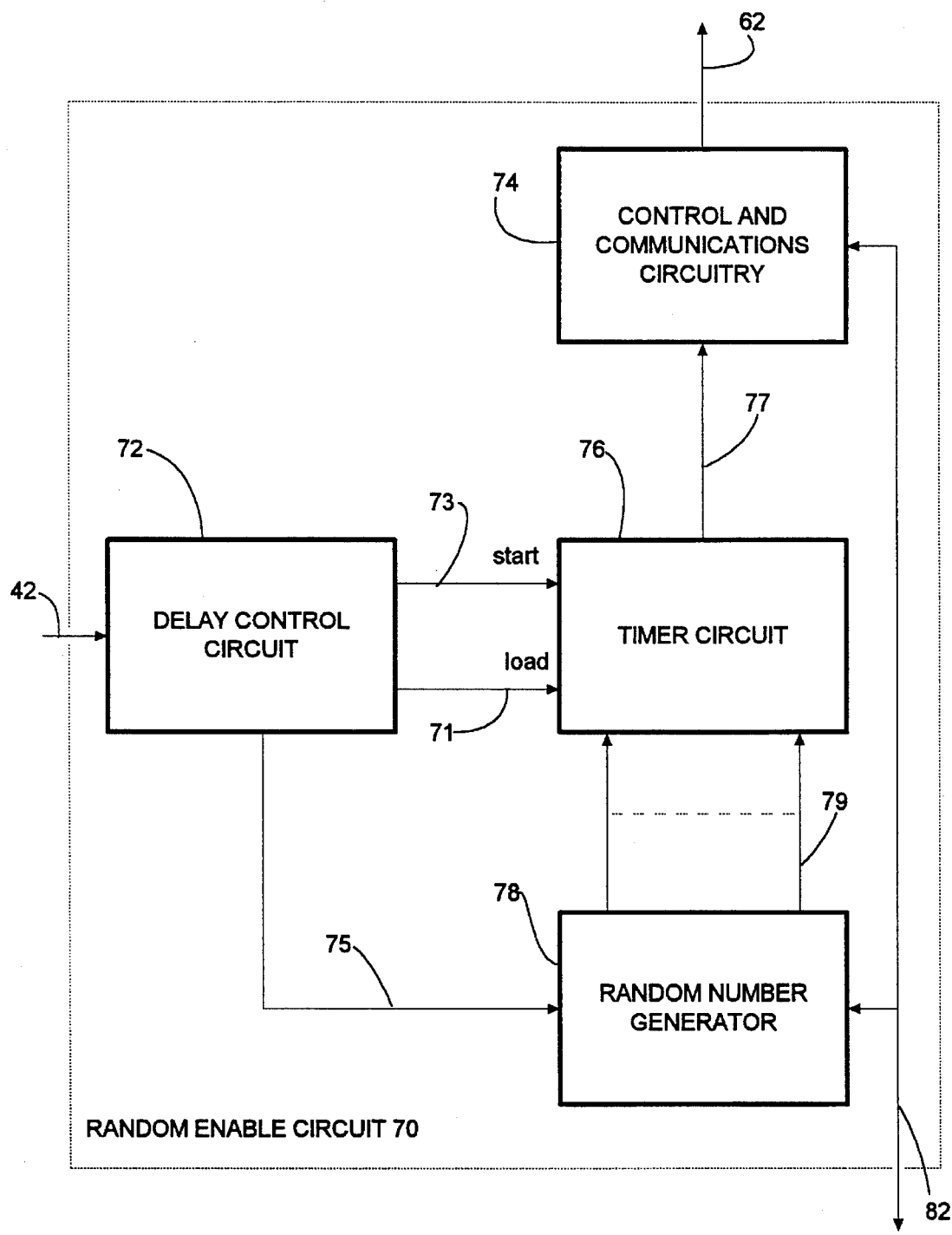
FIG. 3 is a schematic block diagram illustrating the structure of random enable circuit 70 of FIG. 2.

FIG. 3 is a schematic block diagram of random enable circuit 70 of FIG. 2. When the signal provided by power detector 40 on line 42 exhibits a change of state indicative of a resumption of power on the power line feed (e.g. a low-to-high transition) delay control circuit 72, produces a pulse on lead 71, followed by a pulse on lead 73, both of which leads are applied to a timer circuit 76. A signal is also produced by circuit 72 on lead 75, which is applied to random number generator 78. In response, random generator 78 produces a multi-bit, random binary code. This binary code is loaded as a starting time into timer 76, via bod 79, when a pulse appears on lead 71. When a pulse next appears on lead 73, timer 76 begins counting down from the time presented by the binary code. Once timer circuit 76 times out (after the time represented by the binary code has expired), timer circuit 76 provides a signal to control and communications circuit 74, via lead 77, indicative thereof. Control and communication circuit 74 then produces a signal on lead 62 which causes the contactor 65 to close, thereby restoring power to power conditioning and communication circuit 80. It is assumed that, upon the occurrence of a power outage, ground fault interrupter 60 had caused contactor 65 to be triggered or opened, interrupting the supply of power. Via lead 82, circuit 70 provides bilateral communication between power conditioning and communication circuit 80 and circuit 74 and generator 78.

In the preceding discussion generator 78 has been referred to as a random number generator. In practice, it is likely that a pseudorandom number generator of a known design would be used. In any event, it should be appreciated that the terms "random" and "pseudorandom" are often used interchangeably herein and that one necessarily implies the other in the context of the present disclosure.

To summarize the operation of random enable circuit 70, upon the detection of the application or restoration of power, contactor 65 is initially opened, and delay control circuit 72 causes random number generator 78 to produce a pseudorandom code. This code represents a starting time which is then loaded into timer circuit 76, and that circuit begins counting down from this time. When the timer times out, a signal is provided to control and communication circuitry 74, which causes contactor 65 to close. Those skilled in the art will appreciate, however, that the timer circuit could also be a counter which is reset whenever power resumption occurs, that the count of this counter could be compared to the code from random number generator 78, and that the actuating signal to circuitry 74 could be produced when the count of the counter equals the code from the random number generator.

Figure 4:
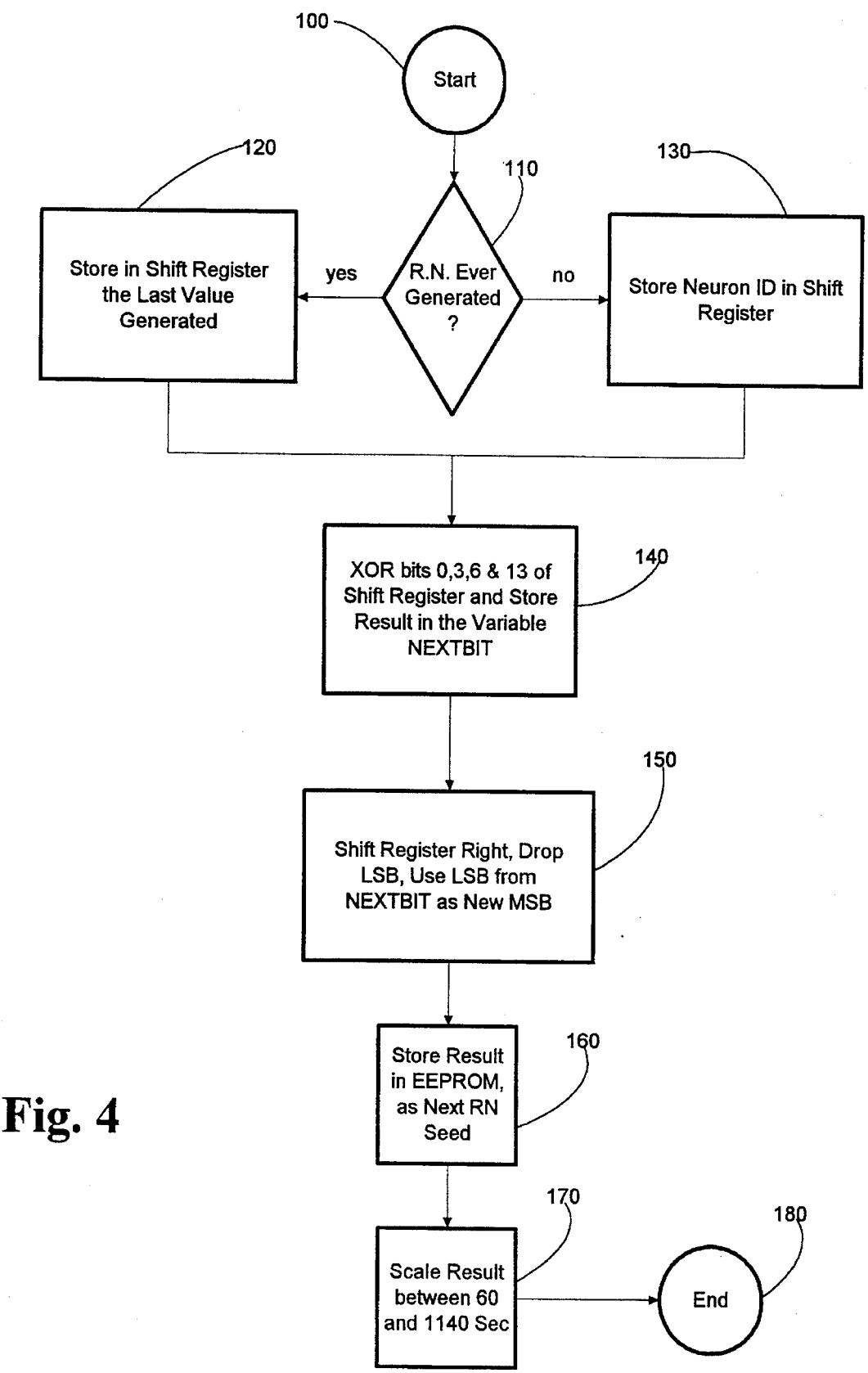
FIG. 4 is a flow chart illustrating the process utilized by random number generator 78 of FIG. 3.

FIG. 4 illustrates the method utilized in random number generator 78 to generate a sequence of pseudorandom codes. This pseudorandom number generator is based upon a device disclosed in "Cycles from Non-Linear Shift Registers" by Golomb, Welsh and Goldstein, JPL Progress Report No. 20-380, Aug. 31, 1959. It may be realized by utilizing a computer program or, as will be obvious to those skilled in the art, by means of hardware.

The pseudorandom number generator utilizes a conventional 16 bit shift register to generate a sequence of 32,767 different pseudorandom codes before repeating the series. In addition to the shift register, the random number generator utilizes an electronically erasable programmable read only memory (EEPROM), which permits information to be retained in a non-volatile manner when power is removed. Upon initiation of the process at block 100, a test is performed at block 110 to determine whether or not the present random number generator has ever generated a random number. This would be utilized in a charging system which includes or is part of a communication network. Each random number generator would then have a unique identification number associated with it which is being referred to as a "neuron ID." Any random number generator which had not previously generated a random number would be a new device. Accordingly, its neuron ID is stored in the shift register (block 130) as an initial "seed" value. This assures that each charging station has a different random number sequence. If the random number generator had been used previously, the last random code generated would have been stored in the EEPROM. Accordingly, this stored number is recalled and stored in the shift register at block 120.

At block 140, an EXCLUSIVE OR operation is performed among bits 0, 3, 6, and 13 of the shift register, and the result is stored in a variable NEXTBIT.

At block 150, the shift register is then shifted right (towards the least significant bit or LSB), and the least significant bit from the variable NEXTBIT is used as the new most significant bit in the shift register. This results in the generation of the next code in the pseudorandom sequence, and this code is stored in the EEPROM at block 160.

At block 170, the new pseudorandom code is scaled between 60 seconds and 1,140 seconds (between 1 and 18 minutes). In effect, the code "0000000000000000" is equated with 60 seconds and the code "1111111111111111" is equated with 1,147 seconds. With a 16 bit shift register, the range of delays between one minute and 18 minutes could then be resolved into as many as 65,536 equally likely values. This permits the range between 1 and 18 minutes to be resolved into convenient sized increments (e.g. 10 or 15 seconds resolution). The process terminates at block 180. However, it would be repeated whenever a vehicle requests charging current. As a result, the vehicle will experience a random delay between one and 18 minutes before it begins receiving its charging current.

Although a preferred form of the invention has been disclosed for illustrative purposes, those skilled in the art will appreciate that many additions, modifications, and substitutions are possible, without departing from the scope and spirit of the invention as defined by the accompanying claims.

What is claimed is:

1. In an apparatus for providing electrical power to a utilization device from a source of power;

switching means actuable to connect said utilization device to said source of power;

means for generating a random number code;

delay means jointly responsive to said random number code and a demand for current by said utilization device for actuating said switching means following an internal delay period; and said random number code controlling said delay means so that the duration of said internal delay period is determined by said random number code.

2. The system of claim 1 wherein said generating means comprises a multi-bit shift register and logic means for logically combining selected bits of said shift register, the logic means having an output signal which is applied as an input signal to said shift register, the bits of said shift register collectively defining said random number code.

3. The system of claim 1 further comprising means for converting the random number code produced by said generating means to a scaled code representing a delay period within a predetermined range of delay periods.

4. The system of claim 1 further comprising nonvolatile, rewritable memory means connected to store a random number code as it is generated.

5. The system of claim 4 further comprising means for initially storing in said shift register, a random number stored in said memory means.

6. The system of claim 4 wherein said generating means comprises a multi-bit shift register and logic means for logically combining selected bits of said shift register, the logic means having an output signal which is applied as an input signal to said shift register, the bits of said shift register collectively defining said random number code.

7. The system of claim 4 further comprising means for converting the random number code produced by said generating means to a scaled code representing a delay period within a predetermined range of delay periods.

8. A method for providing electrical power to a utilization device from a source of power, the method utilizing switching means actuable to connect said utilization device to said source of power, said method comprising the step of, generating a random number code and, in response to a demand for current by said utilization device, delaying the actuation of said switching means by a delay period having a random duration determined by said random number code.

9. The method of claim 8 wherein said random duration is determined by generating a random number code and scaling the random number code within a predetermined range of delay periods.

10. The method of claim 9 wherein the generated random number code is stored in non-volatile, rewritable memory means and is re-called from said memory means to generate a subsequent random number.

* * * * *